(12) United States Patent
Paturu et al.

(10) Patent No.: US 11,308,773 B2
(45) Date of Patent: Apr. 19, 2022

(54) VIRTUAL ASSISTANT BASED EMERGENCY EVACUATION GUIDING SYSTEM

(71) Applicant: Carrier Corporation, Jupiter, FL (US)

(72) Inventors: Sowmya Paturu, Telangana (IN); Prasad Babu Lakshmipathy, Telangana (IN); Sreeramya Soratkal, Telangana (IN); Suzankumar Gongate, Telangana (IN); Chandra Shekhar Pullela, Telangana (IN); Devendra Gupta, Telangana (IN); Liang Cai, Shanghai (CN); Jianwei Zhao, Shanghai (CN); Qiang Li, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/764,587

(22) PCT Filed: Nov. 16, 2017

(86) PCT No.: PCT/CN2017/111295
§ 371 (c)(1),
(2) Date: May 15, 2020

(87) PCT Pub. No.: WO2019/095187
PCT Pub. Date: May 23, 2019

(65) Prior Publication Data
US 2020/0388120 A1 Dec. 10, 2020

(51) Int. Cl.
*G08B 7/06* (2006.01)
*H04W 4/029* (2018.01)
(Continued)

(52) U.S. Cl.
CPC ........... *G08B 7/066* (2013.01); *G03H 1/0005* (2013.01); *G08B 5/36* (2013.01); *G08B 17/107* (2013.01);
(Continued)

(58) Field of Classification Search
CPC ..................................................... G08B 7/066
See application file for complete search history.

(56) References Cited

U.S. PATENT DOCUMENTS 6,150,943 A * 11/2000 Lehman ................. G08B 7/062
340/332
7,579,945 B1 8/2009 Richter et al.
(Continued)

FOREIGN PATENT DOCUMENTS

CN 201441760 U 4/2010
CN 204679804 U 9/2015
(Continued)

OTHER PUBLICATIONS

Airport, Airline, & Transportation Crowd Control Solutions; https://crowdcontrolstore.com/airport-barricades-airline-stanchions/; May 15, 2020; 2 pages.
(Continued)

*Primary Examiner* — Travis R Hunnings
(74) *Attorney, Agent, or Firm* — Cantor Colburn LLP

(57) ABSTRACT

A system for directing an emergency evacuation within a building composed of one or more rooms is provided. The system comprising: a fire panel (180); one or more fire detectors (114) configured to detect a fire in each of the one or more rooms; a fire panel (180) in electronic communication with each of the one or more fire detectors (114), the fire panel (180) being configured to determine evacuation information in response to whether a fire is detected in each of the one or more rooms; and one or more hologram
(Continued)

systems (120) in electronic communication with the fire panel (180), wherein each of the one or more hologram systems (120) is configured to generate a hologram in the one or more rooms to convey evacuation information.

19 Claims, 4 Drawing Sheets

(51) Int. Cl.
| | | |
|---|---|---|
| *H04W 4/80* | (2018.01) | |
| *G03H 1/00* | (2006.01) | |
| *G08B 5/36* | (2006.01) | |
| *G08B 17/107* | (2006.01) | |
| *G08B 25/14* | (2006.01) | |

(52) U.S. Cl.
CPC ............ *G08B 25/14* (2013.01); *H04W 4/029* (2018.02); *H04W 4/80* (2018.02)

(56) References Cited

U.S. PATENT DOCUMENTS

| | | | |
|---|---|---|---|
| 8,473,420 | B2 | 6/2013 | Bohus et al. |
| 8,842,496 | B2 | 9/2014 | Vartanian et al. |
| 9,080,883 | B2 | 7/2015 | Frey |
| 9,177,464 | B2 | 11/2015 | Gregory |
| 9,189,742 | B2 | 11/2015 | London |
| 2005/0275549 | A1 | 12/2005 | Barclay et al. |
| 2009/0096630 | A1 | 4/2009 | Belanger |
| 2009/0189971 | A1 | 7/2009 | Yoder |
| 2010/0207719 | A1 | 8/2010 | Skourup et al. |
| 2011/0007280 | A1 | 1/2011 | Patterson |
| 2012/0047083 | A1* | 2/2012 | Qiao ..................... G08B 21/02 |
| | | | 705/325 |
| 2012/0191488 | A1 | 7/2012 | Alperin |
| 2015/0065078 | A1 | 3/2015 | Mejia et al. |
| 2015/0142536 | A1* | 5/2015 | Marlow ............. H04N 21/8146 |
| | | | 705/14.4 |
| 2016/0007179 | A1 | 1/2016 | Kim |
| 2017/0092109 | A1 | 3/2017 | Trundle et al. |
| 2018/0273345 | A1* | 9/2018 | Rao ........................ B66B 3/008 |
| 2019/0005359 | A1* | 1/2019 | Wilf ..................... G06K 9/6256 |
| 2020/0364534 | A1* | 11/2020 | Dolignon ................. G06N 5/02 |
| 2020/0410844 | A1* | 12/2020 | Wedig ................... G08B 17/10 |

FOREIGN PATENT DOCUMENTS

| | | |
|---|---|---|
| CN | 103157200 B | 4/2016 |
| CN | 105561492 A | 5/2016 |
| EP | 2955705 A1 | 12/2015 |
| JP | 2016038755 A | 3/2016 |
| KR | 20130133478 A | 12/2013 |
| KR | 20170025436 A | 3/2017 |

OTHER PUBLICATIONS

James Walsh; Are you spooked by the National Rail holograms?; https://www.theguardian.com/uk-news/2014/oct/16/are-you-spooked-by-the-national-rail-holograms; Oct. 16, 2014; 3 pages.

Jeff Blagdon; Infrared holography lets firefighters see through fire and smoke; https://www.theverge.com/2013/2/27/4034968/firefighters-see-through-fire-with-infrared-holography; Feb. 27, 2013; 4 pages.

Notification of Transmittal of the International Search Report for International Application No. PCT/CN2017/111295 Report dated Aug. 14, 2018; Report dated Aug. 21, 2018; 6 pages.

Written Opinion of the International Searching Authority for International Application No. PCT/CN2017/111295; Report dated Aug. 14, 2018; Report dated Aug. 21, 2018; 4 pages.

\* cited by examiner

VIRTUAL ASSISTANT BASED EMERGENCY EVACUATION GUIDING SYSTEM

CROSS-REFERENCE TO RELATED APPLICATIONS

This application is a National Stage Application of International Application No. PCT/CN2017/111295 filed Nov. 16, 2017, the disclosure of which is incorporated herein by reference in its entirety.

BACKGROUND

The embodiments herein generally relate to fire detection systems and more specifically, the fire detection systems within buildings.

Typically, building fire alarm systems and smoke detectors inform a local controller to trigger an alarm as well as suppression (i.e. water sprinklers) and egress systems (visual and audible signals) in order to stop fire from spreading and alert building occupant evacuees. Current building fire alarm systems provide little additional assistance to evacuees other than activating an alarm that identifies that there may be a fire somewhere in a building.

BRIEF DESCRIPTION

According to one embodiment, a system for directing an emergency evacuation within a building composed of one or more rooms is provided. The system comprising: a fire panel; one or more fire detectors configured to detect a fire in each of the one or more rooms; a fire panel in electronic communication with each of the one or more fire detectors, the fire panel being configured to determine evacuation information in response to whether a fire is detected in each of the one or more rooms; and one or more hologram systems in electronic communication with the fire panel, wherein each of the one or more hologram systems is configured to generate a hologram in the one or more rooms to convey evacuation information.

In addition to one or more of the features described above, or as an alternative, further embodiments may include that the evacuation information includes an exit located nearest to each of the one or more holograms.

In addition to one or more of the features described above, or as an alternative, further embodiments may include that the hologram system is configured to adjust the hologram in response to attributes of the smoke detected.

In addition to one or more of the features described above, or as an alternative, further embodiments may include one or more human presence detectors in in electronic communication with the fire panel, wherein each of the one or more human presence detectors are configured to detect a location of a person in the one or more rooms.

In addition to one or more of the features described above, or as an alternative, further embodiments may include that the one or more human presence detectors are configured to detect a location of a person through a wireless communication with a user device configured to be carried by the person.

In addition to one or more of the features described above, or as an alternative, further embodiments may include that the user device is at least one of a card and a mobile computing device.

In addition to one or more of the features described above, or as an alternative, further embodiments may include that the wireless communication is Bluetooth.

In addition to one or more of the features described above, or as an alternative, further embodiments may include that each of the one or more human presence detectors is configured to transmit the location of the person to the fire panel.

In addition to one or more of the features described above, or as an alternative, further embodiments may include that the fire panel is configured to transmit the location of the person to a first responder device.

According to another embodiment, a system for directing an emergency evacuation within a building composed of one or more rooms is provided. The system comprising: a fire panel; one or more fire detectors configured to detect a fire in each of the one or more rooms; a fire panel in electronic communication with each of the one or more fire detectors, the fire panel being configured to determine evacuation information in response to whether a fire is detected in each of the one or more rooms; and one or more human presence detectors in in electronic communication with the fire panel, wherein each of the one or more human presence detectors are configured to detect a location of a person in the one or more rooms, wherein the one or more human presence detectors are configured to detect a location of a person through a wireless communication with a user device configured to be carried by the person.

In addition to one or more of the features described above, or as an alternative, further embodiments may include that the user device is at least one of a card and a mobile computing device.

In addition to one or more of the features described above, or as an alternative, further embodiments may include that the wireless communication is Bluetooth.

In addition to one or more of the features described above, or as an alternative, further embodiments may include that each of the one or more human presence detectors is configured to transmit the location of the person to the fire panel.

In addition to one or more of the features described above, or as an alternative, further embodiments may include that the fire panel is configured to transmit the location of the person to a first responder device.

In addition to one or more of the features described above, or as an alternative, further embodiments may include one or more hologram systems in electronic communication with the fire panel, wherein each of the one or more hologram systems is configured to generate a hologram in the one or more rooms to convey evacuation information.

In addition to one or more of the features described above, or as an alternative, further embodiments may include that the evacuation information includes an exit located nearest to each of the one or more holograms.

In addition to one or more of the features described above, or as an alternative, further embodiments may include that the hologram system is configured to adjust the hologram in response to attributes of the smoke detected.

According to another embodiment, a method of directing an emergency evacuation is provided. The method comprising: detecting a fire in one or more rooms using one or more fire detectors; activating one or more holograms within at least one of the one or more rooms; determining evacuation information in response to whether a fire is detected in each of the one or more rooms; and conveying evacuation information using the one or more holograms.

In addition to one or more of the features described above, or as an alternative, further embodiments may include detecting attributes of smoke in at least one of the one or more rooms; and adjusting the hologram in response to attributes of the smoke detected.

In addition to one or more of the features described above, or as an alternative, further embodiments may include detecting a person within one of the one or more rooms using a human presence detector; and determining a location of the person within the one of the one or more rooms.

Technical effects of embodiments of the present disclosure include a visual egress system that can help direct evacuees to the nearest exit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
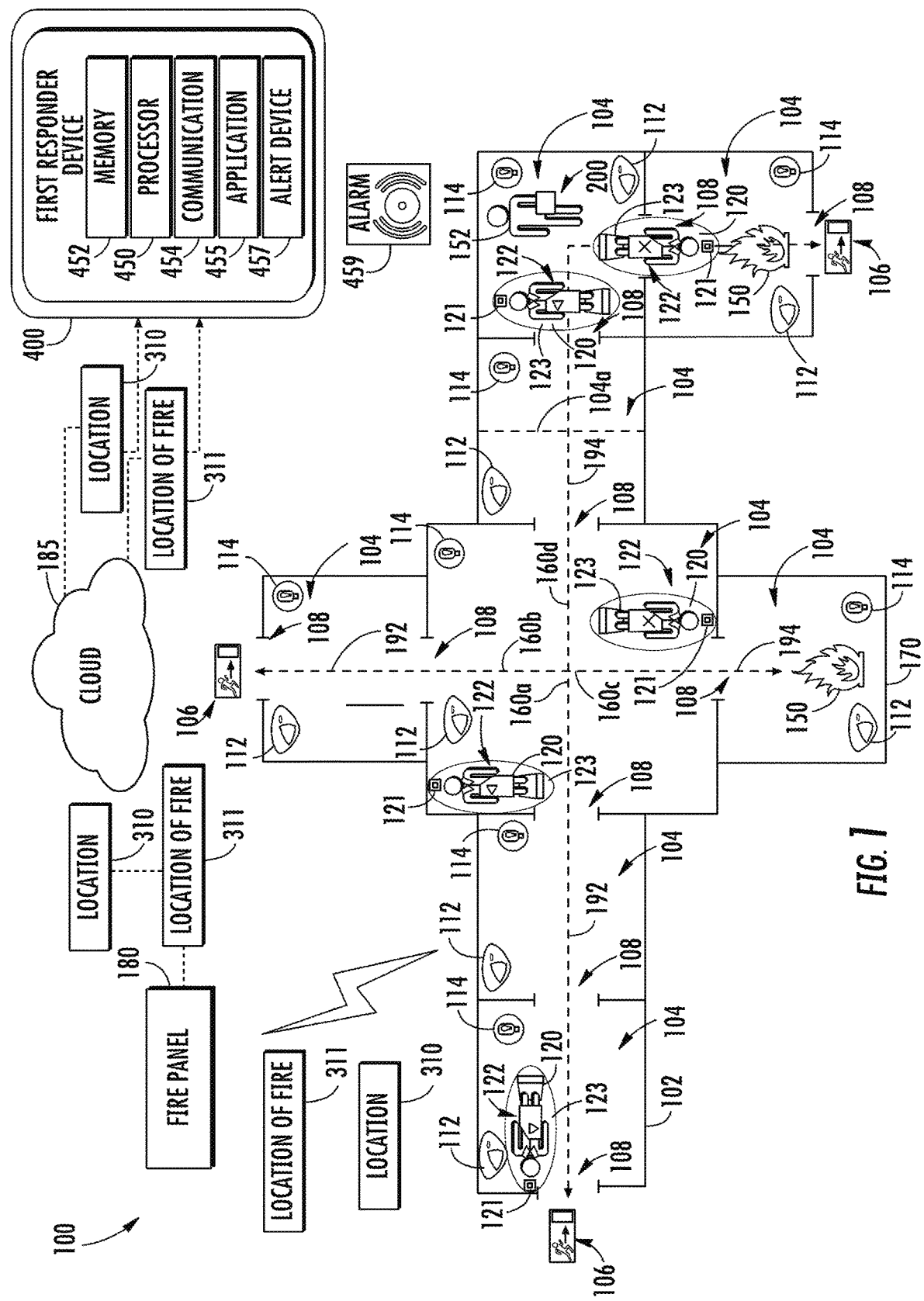
FIG. 1 is a schematic illustration of a system for directing an emergency evacuation within a building composed of one or more rooms, according to an embodiment of the present disclosure.
Figure 2:
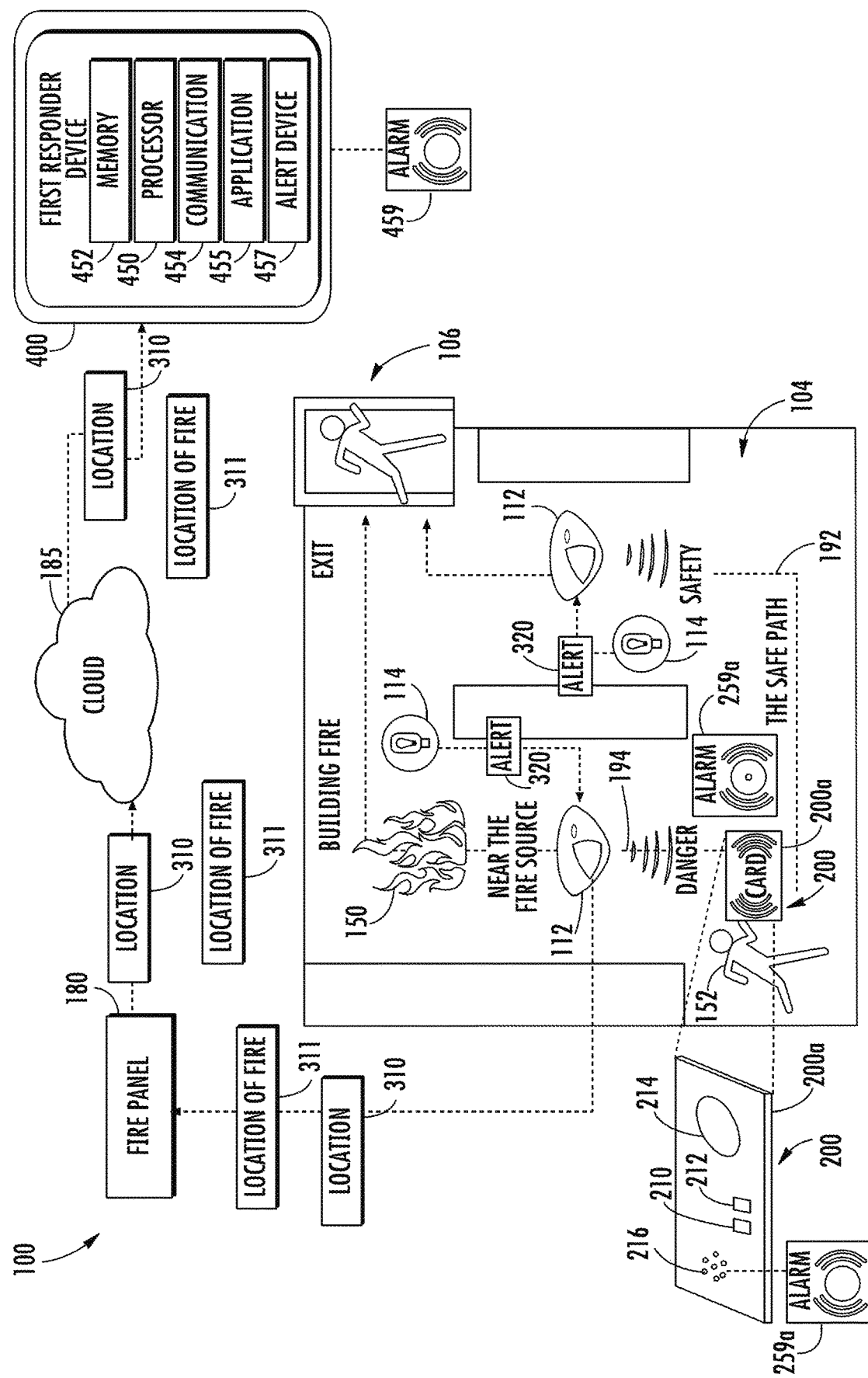
FIG. 2 is a schematic illustration of human presence detecting using a card, according to an embodiment of the present disclosure.
Figure 3:
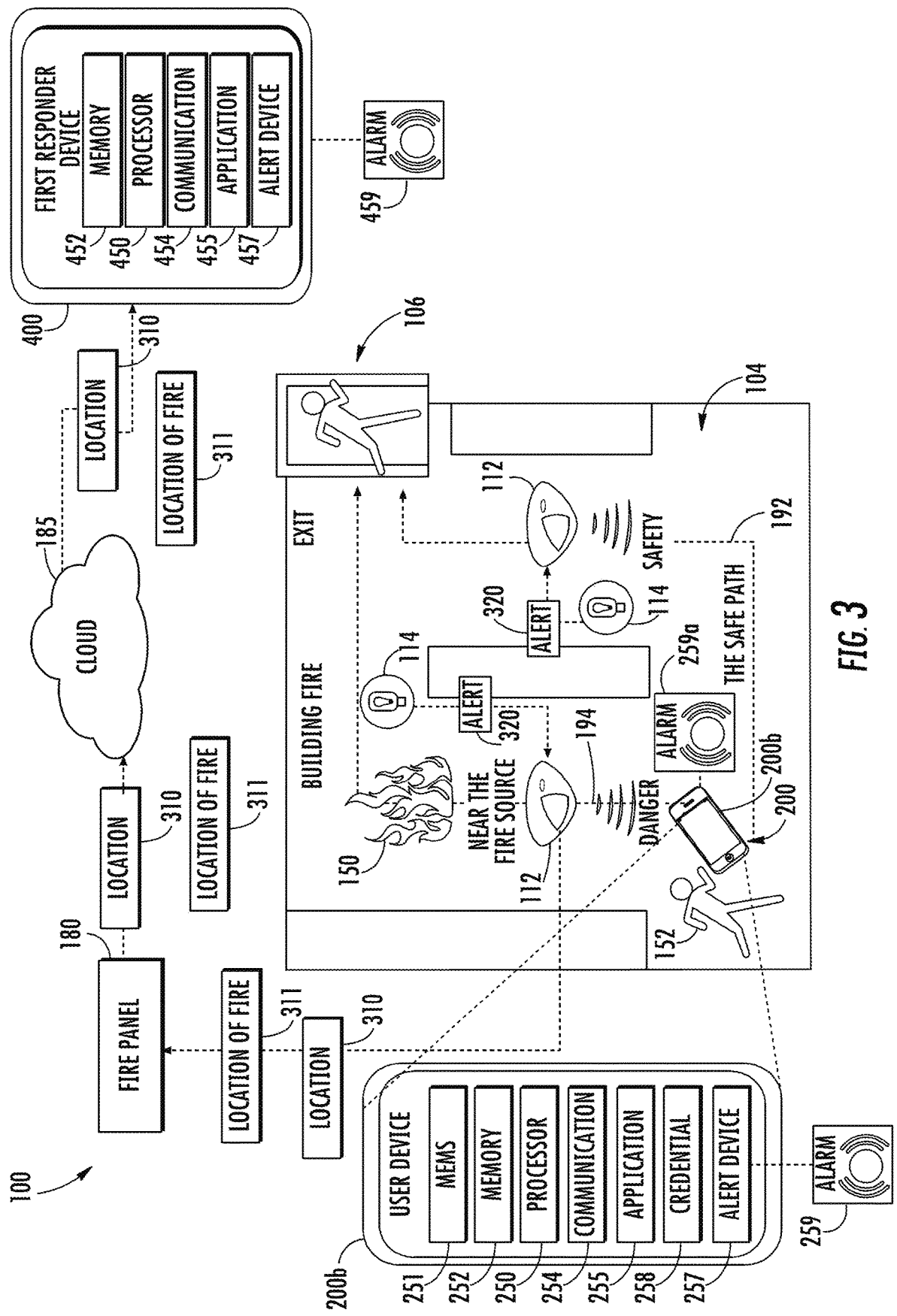
FIG. 3 is a schematic illustration of human presence detecting using a mobile computing device, according to an embodiment of the present disclosure.

Referring to FIGS. 1-3, various embodiments of the present disclosure are illustrated. FIG. 1 shows a system 100 for directing an emergency evacuation within a building 102 composed of a plurality of rooms 104. Each of the rooms 104 may be separated by entryways 108. The entryway 108 may be a door or an opening. The rooms 104 may be subdivided in to zones 104a.

As seen in FIG. 1, the building 102 includes a one or more fire detectors 114 configured to detect a fire 150 in each room 104. Further, the fire detectors 114 are also configured to identify a location 311 of the fire 150. Each room 104 may have one or more fire detectors 114 located within the room 104. Each room 104 may be sub-divided into zones 104a. Each fire detector 114 may be in electronic communication with one or more other fire detectors 114 and a fire panel 180. The electronic communication may be wired and/or wireless. The fire panel 180 may be in communication with a cloud computing network 185.

The building 102 also includes one or more hologram systems 120 configured to convey/display evacuation information 122 using a hologram 123. The hologram 123 may be a reflection hologram, a transmission hologram, or any other type of hologram known to one of skill in the art. The hologram 123 may be located in a glass tube. The hologram 123 may be three-dimensional. The plurality of hologram systems 120 may each be in communication with the fire panel 180. The fire panel 180 is configured to determine the evacuation information 122 from information received from each fire detector 114. The communication may be wired and/or wireless. Each hologram 123 may be a static and/or dynamic image (e.g. video). The image may be three-dimensional. The image may be of a person and/or a map. The person is recorded as an object, from the scattered light and then it is reconstructed when the hologram projection is triggered. Advantageously, displaying an image of a person presenting evacuation information 122 helps have a calming effect on evacuees. The hologram system 120 may be configured to display evacuation information through both visual and audible means. For example, the hologram system 120 may project a visual image of a person as a hologram 123 and the person in the hologram 123 may be stating audibly where the nearest exit 106 is located. Further, the evacuation information 122 may include but is not limited to a map to a nearest exit 106 or a do not enter warning. In a non-limiting example, the hologram system 120 may convey evacuation information 122 showing a map to the nearest exit if the person 152 is on a safe path 192. In another non-limiting example, the hologram system 120 may convey evacuation information 122 showing a do not enter warning if the person 152 is on an unsafe path 194 that may lead towards a fire 150. The fire panel 180 is configured to determine an evacuation route to an exit 106 located nearest to each hologram system 120 and convey that information to the hologram system 120 so that it may be displayed using the hologram 123.

The fire panel 180, human presence detectors 112, fire detectors 114 and/or each hologram system 120 may include a processor and an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

FIG. 1 shows multiple evacuation routes 160a-160d but only two routes 160a, 160b are safe paths 192 because they do not travel through a room 104 where fire 150 has been detected and/or a dead end 170. As seen in FIG. 1, route 160c leads to a dead end 170 where a fire 150 is located and the hologram systems 120 in the direction of route 160c may warn evacuees to not enter. The route 160d leads to an exit 106 but the route 160d is blocked by fire 150, thus the hologram systems 120 heading in the direction of route 160d will warn evacuees not to enter. When traveling in the opposite direction of routes 160c, 160d, the hologram systems 120 may display an evacuation route to a nearest exit 106 as the evacuation information 122 to help guide evacuees out and away from the fire 150. Likewise, when traveling along safe paths 192, such as routes 160a, and 160b, the hologram systems 120 may display an evacuation route to a nearest exit 106 as the evacuation information 122 to help guide evacuees out and away from the fire 150.

Hologram system 120 includes a hologram projector 121 configured to generate the hologram 123. Attributes of smoke including but not limited to, density and color, may affect visibility of the hologram 123, thus the hologram projector 121 is configured adjust at least one of the intensity and color of the hologram 123 in response to attributes of the smoke from the fire 150. The hologram system 120 may detect attributes of the smoke from the fire 150 and/or the fire detector 114 may detect attributes of the smoke from the fire 150 and convey the attributes to the hologram system 120 through the fire panel 180.

The building 102 also includes a plurality of human presence detectors 112 configured to detect a human being 152 in each room 104 and transmit the location and presence to the fire panel 180. In an embodiment, the human presence detectors 112 may only actively detect human beings 152 when the fire panel 180 and/or fire detector 114 indicates there is a fire 150 present. Each room 104 may have one or more human presence detectors 112 located within the room 104. Each human presence detector 112 may be in communication with one or more other human presence detectors 112 and the fire panel 180. The human presence detector may be located within the fire detector 114. The human presence detector 112 may use a variety of ranging sensors and/or presence detection devices to detect human beings such as, for example, a visual detection device, a laser detection device, a thermal image detection device, a depth detection device, a motion detection device, an odor detection device, RADAR, ultrasonic sensor, a radio signal transponder, and a blue tooth transponder.

As shown in FIGS. 1, 2, and 3, the human presence detector 112 may communicate with a user device 200 configured to be carried by a person 152. The human presence detector 112 is configured to detect a location 310 of a person 152 through wireless communication with the user device 200 configured to be carried by the person 152. In two non-limiting examples, the user device 200 may be a card 200a as shown in FIG. 2, for example, an enhanced badge or keycard, or other electronically enabled card, as an additional non-limiting example a card configured to be carried by a visually impaired or hearing impaired individual, and/or a mobile computing device 200b as shown in FIG. 3.

The fire panel 180 may be in communication with a first responder device 400 through the cloud computing network 185. A location 311 of the fire 150 and a location 310 of a human being 152 may be transmitted to the first responder device 400 through the cloud computing network 185. The first responder device 400 may belong to a first responder, such as, for example, a 911 dispatcher, police officer, fire fighter, paramedic, nurse, doctor, soldier, sailor, airman, security guard, or other first responder. The first responder may then use the location 310 to help find the person 152 within the building 102. The first responder device 400 may be a computing device such as a desktop computer. The first responder device 400 may also be a mobile computing device that is typically carried by a person, such as, for example a phone, PDA, smart watch, tablet, laptop, etc. The first responder device 400 may also be two or more separate devices that are synced together such as, for example, a cellular phone and a desktop computer synced over an internet connection. The first responder device 400 may include a processor 450, memory 452, and communication module 454 as shown in FIGS. 1-3. The processor 450 can be any type or combination of computer processors, such as a microprocessor, microcontroller, digital signal processor, application specific integrated circuit, programmable logic device, and/or field programmable gate array. The memory 452 is an example of a non-transitory computer readable storage medium tangibly embodied in the first responder device 400 including executable instructions stored therein, for instance, as firmware. The communication module 454 may implement one or more communication protocols as described in further detail herein. The first responder device 400 may include an alert device 457 configured to activate an alarm 459. In three non-limiting examples, the alert device 457 may be a vibration motor, audio speaker, and/or display screen. The alarm 459 may be audible, visual, haptic, and/or vibratory. The first responder device 400 may also include an application 455. Embodiments disclosed herein, may operate through the application 455 installed on the first responder device 400.

The fire panel 180 and/or an application on a constituent element (e.g. a server) of the cloud computing network 185 may control the system 100. For example, when a fire 150 is detected by a fire detector 114, the location 311 of the fire 150 as well as the location 310 of the user device 200 is transmitted to the cloud computing network 185 through the fire panel 180. The fire panel 180 and/or the application on a constituent element (e.g. a server) cloud computing network 185 may be configured determine safe paths 192 to evacuate the building 102 for the user device 200, as well as unsafe paths for the user device 200. The safe paths 192 and unsafe paths 194 are then transmitted from the cloud computing network 185 to the fire panel 180. The fire panel 180 communicates the safe paths 192 and unsafe paths 194 to the human presence detectors 112. As a non-limiting example, if a user device is located within a communication range 112 of the human presence detector 112, the human presence detector 112 may transmit to the user device 200 whether the user device 200 is on a safe path 192 or an unsafe path 194, as described below. Such communication may be direct, between the human presence detector 112 and the user device 200, or indirect through a relay in proximity to the human presence detector 112 and/or the user device 200.

In the example of FIG. 2, the user device 200 is a card 200a. The card 200a may be an identification card such as a key card or badge, or other enhanced electronically enabled card carried by a person 152 as described above. The card 200a is configured to communicate wirelessly with the human presence detectors 112. The communication may be through radio signals such as, for example, Wi-Fi, Bluetooth and/or RFID. The communication may be bilateral or unilateral between the card 200a and the human presence detectors 112. The human presence detector 112 may receive an alert 320 from the fire detector 112 and the alert 320 may be transmitted to the card 200a. The alert 320 may indicate that a fire 150 has been detected on a path of the person 152. The alert 320 may also indicate that a fire 150 has not been detected on a path of the person 152 and the person 152 is safe to proceed. The alert 320 may activate an alarm 259a on the card 200a when received in order to notify the person 152. The alarm 259a may be visual, audible, and/or vibratory. In one example, if the alert 320 indicates that the person 152 is on a safe path 192 then the alarm 259a may vibrate the card 200a through a buzzer 216 and an LED light 212 on the card 200a may illuminate green; in some embodiments an audible noise or verbal sound may be issued from a speaker 216. In another example, if the alert 320 indicates that the person 152 is on an unsafe path 194 then the alarm 259a may vibrate the card 200a through the buzzer 216 and an LED light 210 on the card 200a may illuminate red; in some embodiments an audible noise or verbal sound may be issued from a speaker 216. As mentioned above, the cloud computing network 185 may determine safe paths 192 and unsafe paths 194 for each card 200a. The buzzer and/or speaker 216 and LED lights 210, 212 may be prompted to activate automatically by the system 100 or may be prompted to activate by a person 152 pressing a button 214. In a non-limiting embodiment, the card 200a may only be visible to the human presence detectors 112 after the button 214 is pressed and/or while the button 214 is being pressed.

The human presence detector 112 may detect a location 310 of the card 200a and transmit the location to the fire panel 180. The location 310 of the card 200a is thus indicative of the location of the person 152 carrying the card 200a. The human presence detector 112 may determine that the card 200a is moving if multiple human presence detectors 112 detect the card 200a of a period of time. For example, if the card 200a is detected in a first room 104 at a first time and then in a second room at a second time, it may be determined that the card 200a moved from the first room 104 to the second room 104 between the first time and the second time. If the location 310 of the card 200a has not moved within a selected time period then it may be an indication that the person 152 carrying the card 200a is in distress or left their card 200a in a location. In one example, the person 152 may have passed out due to smoke inhalation or that the person 152 may have been otherwise disabled due to emergency conditions, and the location 310 is no longer changing over the selected period of time. Alternatively, if the card 200a has not moved within a selected time period but is located at a desk of a person 152, it may be an indication that the person 152 carrying the card 200a left the card 200a at their desk. The location 310 of the card 200a may be determined in a variety of methods including but not limited to signal strength between the card 200a and a human presence detector 112 and/or triangulation between the card 200a and multiple human presence detectors 112. In an embodiment, the card 200a communicates with one or more human presence detectors 112 via Bluetooth and the signal strength of the Bluetooth communication may be used to calculate the distance between a card 200a and each human presence detector 112 in Bluetooth communication range of the card 200a. The fire panel 180 may transmit the location 310 to a first responder device 400 through a cloud computing network 185.

In the example of FIG. 3, the user device 200 is a mobile computing device 200b. The mobile computing device 200b may also be a device that is typically carried by a person, such as, for example a phone, PDA, smart watch, tablet, laptop, etc. The mobile computing device 200b may include a processor 250, memory 252, communication module 254, and one or more Microelectromechanical systems (MEMS) sensor 251, as shown in FIG. 3. The MEMS sensor may be a sensor such as, for example, an accelerometer, a gyroscope, or a similar or other sensor known to one of skill in the art. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile computing device 200b including executable instructions stored therein, for instance, as firmware. The communication module 254 may implement one or more communication protocols as described in further detail herein. The mobile computing device 200b is configured to store a unique credential 258 that may be shared with the fire panel 180 to identify what person 152 the mobile computing device 200b belongs to. In a non-limiting example, the mobile computing device 200b may belong to an employee and/or resident of the building 102. The mobile computing device 200b may include an alert device 257 configured to activate an alarm 259. In three non-limiting examples, the alert device 257 may be a vibration motor, audio speaker, and/or display screen. The alarm 259 may be audible, visual, haptic, and/or vibratory. The mobile computing device 200b may also include an application 255. Embodiments disclosed herein, may operate through the application 255 installed on the mobile computing device 200b.

The mobile computing device 200b is configured to communicate wirelessly with the human presence detectors 112 and/or the fire detectors 114. The communication may be through radio signals such as, for example, Bluetooth or Wi-Fi. In one non-limiting example, the communication between a fire detector 114 and the mobile computing device 200b may through a selected radio frequency, thus the fire detector 114 may be RF enabled. The communication may be bilateral or unilateral between the mobile computing device 200b and the fire detectors 114. The communication may be bilateral or unilateral between the mobile computing device 200b and the human presence detectors 112. The human presence detector 112 may receive an alert 320 from the fire detector 114 and the alert 320 may be transmitted to the mobile computing device 200b through the human presence detector 112, directly from the fire detector 114, or relayed wirelessly through another device such as a router or another mobile computing device 200b. The alert 320 may indicate that a fire 150 has been detected on a path of the person 152, thus the person is on an unsafe path 194. The alert 320 may also indicate that a fire 150 has not been detected on a path of the person 152 and the person is safe to proceed on the safe path 192. As mentioned above, the fire panel 180 and/or an application on a constituent element (e.g. a server) of the cloud computing network 185 may determine safe paths 192 and unsafe paths 194 for each mobile computing device 200b. The alert 320 may activate an alarm 259 on the mobile computing device 200b when received in order to notify the person 152. The alarm 259 may be visual, audible, and/or vibratory.

The human presence detector 112 and/or the fire detector 114 may detect a location 310 of the mobile computing device 200b and transmit the location 310 to the fire panel 180. The location 310 of the mobile computing device 200b is thus indicative of the location of the person 152 carrying the mobile computing device 200b. If the location 310 of the mobile computing device 200b has not moved within a selected time period then it may be an indication that the person 152 carrying the mobile computing device 200b is in distress left their mobile computing device 200b in a location. In one example, if the mobile computing device 200b was in motion as detected by MEMS 251 in the mobile computing device 200b and the location 310 is no longer changing over the selected period of time it may be determined that the person 152 may have passed out due to smoke inhalation or that the person 152 may have been otherwise disabled due to emergency conditions. Alternatively, if the mobile computing device 200b has not moved within a selected time period but is located at a desk of a person 152, it may be an indication that the person 152 carrying the mobile computing device 200b left the mobile computing device 200b at their desk. The location 310 of the mobile computing device 200b may be determined in a variety of methods including but not limited to signal strength between the mobile computing device 200b and a human presence detector 112, triangulation between the mobile computing device 200b and multiple human presence detectors 112, and/or a global positioning system (GPS) associated with the mobile computing device 200b. The movement of the person 152 may be determined via a MEMS 251, which may include but is not limited to an accelerometer, a gyroscope, or similar device located in mobile computing device 200*b*. The fire panel 180 may transmit the location 310 to the first responder device 400, as described above.

Figure 4:
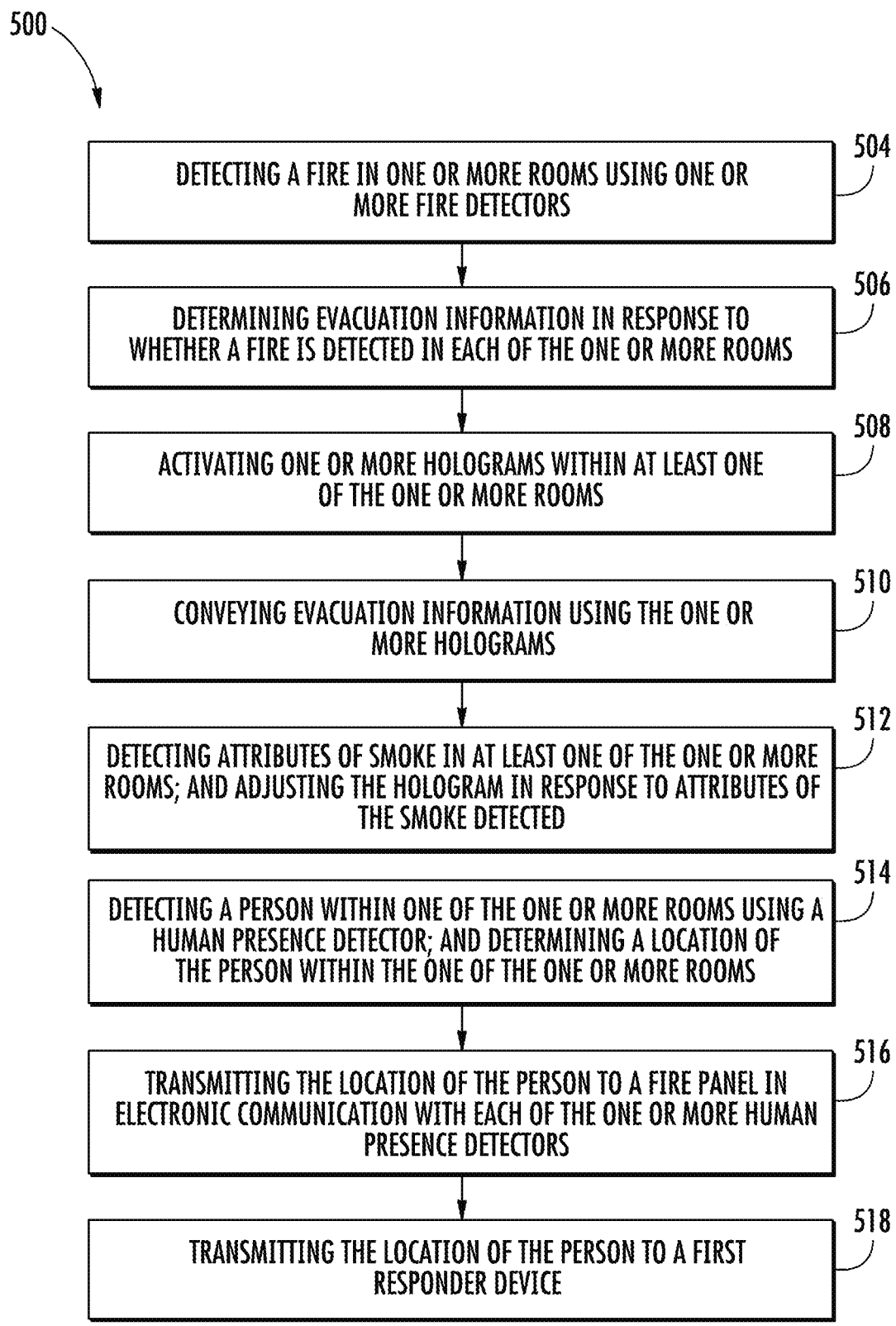
FIG. 4 is a flow diagram illustrating a method for directing an emergency evacuation, according to an embodiment of the present disclosure.

Turning now to FIG. 4 with continued reference to FIGS. 1-3, FIG. 4 shows a flow diagram illustrating a method 500 of directing an emergency evacuation, according to an embodiment of the present disclosure. At block 504, a fire is detected in one or more rooms 104 using one or more fire detectors 114. At block 506, evacuation information 122 is determined in response to whether a fire 150 is detected in each of the one or more rooms 104. At block 508, one or more holograms 123 configured to convey/display evacuation information as described above are activated within at least one of the one or more rooms 104. At block 510, evacuation information 122 is conveyed using the one or more holograms 123. The evacuation information 122 may be conveyed visually and or audibly by each hologram 123, as described above.

At block 512, attributes of smoke are detected in at least one of the one or more rooms 104 and the hologram 123 is adjusted in response to attributes of the smoke detected. At block 514, a person 152 is detected within one of the one or more rooms 104 using a human presence detector 112 and a location of the person 152 within the one of the one or more rooms is determined. At block 516, the location 310 of the person 152 is transmitted to a fire panel 180 in electronic communication with each of the one or more human presence detectors 112. At block 518, the location 310 of the person 154 is transmitted to a first responder device 400.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for directing an emergency evacuation within a building composed of one or more rooms, the system comprising:
   a fire panel;
   one or more fire detectors configured to detect a fire in each of the one or more rooms;
   a fire panel in electronic communication with each of the one or more fire detectors, the fire panel being configured to determine evacuation information in response to whether a fire is detected in each of the one or more rooms; and
   one or more hologram systems in electronic communication with the fire panel, wherein each of the one or more hologram systems is configured to generate a hologram in the one or more rooms to convey evacuation information,
   wherein the hologram is a dynamic image of a human being presenting the evacuation information by stating audibly where the nearest exit is located, wherein audible instructions are provided by a speaker and the hologram is synced with the speaker to make it appear that the dynamic image of the human being is talking when the evacuation information is presented.

2. The system of claim 1, wherein:
   the hologram system is configured to adjust at least one of an intensity and a color of the hologram in response to attributes of the smoke detected.

3. The system of claim 1, further comprising:
   one or more human presence detectors in in electronic communication with the fire panel, wherein each of the one or more human presence detectors are configured to detect a location of a person in the one or more rooms.

4. The system of claim 3, wherein:
   the one or more human presence detectors are configured to detect a location of a person through a wireless communication with a user device configured to be carried by the person.

5. The system of claim 4, wherein:
   the user device is a card,
   wherein the card is configured to receive an alert from the one or more fire detectors and activate an alarm based on the alert to notify a person in possession of the card whether the person is on a safe path or an unsafe path.

6. The system of claim 4, wherein:
   the wireless communication is Bluetooth.

7. The system of claim 4, wherein:
the one or more human presence detectors is configured to transmit the location of the person to the fire panel.

8. The system of claim 7, wherein:
the fire panel is configured to transmit the location of the person to a first responder device.

9. A system for directing an emergency evacuation within a building composed of one or more rooms, the system comprising:
a fire panel;
one or more fire detectors configured to detect a fire in each of the one or more rooms;
a fire panel in electronic communication with each of the one or more fire detectors, the fire panel being configured to determine evacuation information in response to whether a fire is detected in each of the one or more rooms; and
one or more human presence detectors in in electronic communication with the fire panel, wherein each of the one or more human presence detectors are configured to detect a location of a person in the one or more rooms, wherein the one or more human presence detectors are configured to detect a location of a person through a wireless communication with a user device configured to be carried by the person,
wherein the user device is configured to receive an alert from the one or more fire detectors and activate an alarm based on the alert to notify a person in possession of the user device whether the person is on a safe path or an unsafe path,
wherein the user device is a card.

10. The system of claim 9, wherein:
the wireless communication is Bluetooth.

11. The system of claim 9, wherein:
each of the one or more human presence detectors is configured to transmit the location of the person to the fire panel.

12. The system of claim 11, wherein:
the fire panel is configured to transmit the location of the person to a first responder device.

13. The system of claim 9, further comprising:
one or more hologram systems in electronic communication with the fire panel, wherein each of the one or more hologram systems is configured to generate a hologram in the one or more rooms to convey evacuation information, and wherein the hologram is a dynamic image of a human being presenting the evacuation information by stating audibly where the nearest exit is located, wherein audible instructions are provided by a speaker and the hologram is synced with the speaker to make it appear that the dynamic image of the human being is talking when the evacuation information is presented.

14. The system of claim 13, wherein:
the hologram system is configured to adjust at least one of an intensity and a color of the hologram in response to attributes of the smoke detected.

15. A method of directing an emergency evacuation, the method comprising:
detecting a fire in one or more rooms using one or more fire detectors;
activating one or more holograms within at least one of the one or more rooms;
determining evacuation information in response to whether a fire is detected in each of the one or more rooms; and
conveying evacuation information using the one or more holograms, wherein each of the one or more the holograms is a dynamic image of a human being presenting the evacuation information by stating audibly where the nearest exit is located, wherein audible instructions are provided by a speaker and the hologram is synced with the speaker to make it appear that the dynamic image of the human being is talking when the evacuation information is presented.

16. The method of claim 15, further comprising:
detecting attributes of smoke in at least one of the one or more rooms; and
adjusting at least one of an intensity and a color of the hologram in response to attributes of the smoke detected.

17. The method of claim 15, further comprising:
detecting a person within one of the one or more rooms using a human presence detector; and
determining a location of the person within the one of the one or more rooms.

18. The system of claim 5, wherein:
the card comprising at least one of a buzzer or an LED light,
wherein the buzzer is configured to vibrate to indicate whether the person in possession of the card is on a safe path, and
wherein the LED light is configured to illuminate to indicate whether the person in possession of the card is on a safe path.

19. The system of claim 9, wherein:
the card comprising at least one of a buzzer or an LED light,
wherein the buzzer is configured to vibrate to indicate whether the person in possession of the card is on a safe path, and
wherein the LED light is configured to illuminate to indicate whether the person in possession of the card is on a safe path.

* * * * *